(No Model.) 9 Sheets—Sheet 1.

G. W. DUDLEY.
COMBINED ADDING AND PRINTING MACHINE.

No. 555,039. Patented Feb. 18, 1896.

WITNESSES:
Fred G. Dieterich
Edw. W. Byrn

INVENTOR
George W. Dudley
BY Munn & Co
ATTORNEYS.

(No Model.) 9 Sheets—Sheet 2.

G. W. DUDLEY.
COMBINED ADDING AND PRINTING MACHINE.

No. 555,039. Patented Feb. 18, 1896.

Fig. 2.

WITNESSES:
Fred G. Dieterich
Edw. W. Byrn

INVENTOR
George W. Dudley
BY
Munn & Co
ATTORNEYS.

(No Model.)
9 Sheets—Sheet 3.

G. W. DUDLEY.
COMBINED ADDING AND PRINTING MACHINE.

No. 555,039. Patented Feb. 18, 1896.

WITNESSES:
Fred G. Dieterich
Edw. W. Byrn

INVENTOR
George W. Dudley
BY
ATTORNEYS.

(No Model.) 9 Sheets—Sheet 4.
G. W. DUDLEY.
COMBINED ADDING AND PRINTING MACHINE.

No. 555,039. Patented Feb. 18, 1896.

WITNESSES:
Fred G. Dieterich
Edw. W. Byrn.

INVENTOR
George W. Dudley
BY Munn & Co.
ATTORNEYS.

(No Model.) 9 Sheets—Sheet 6.

G. W. DUDLEY.
COMBINED ADDING AND PRINTING MACHINE.

No. 555,039. Patented Feb. 18, 1896.

WITNESSES:
Fred G. Dieterich
Edw. W. Byrn

INVENTOR
George W. Dudley
BY
Munn & Co
ATTORNEYS.

(No Model.) 9 Sheets—Sheet 7.
G. W. DUDLEY.
COMBINED ADDING AND PRINTING MACHINE.

No. 555,039. Patented Feb. 18, 1896.

WITNESSES:
Fred G. Dieterich
Edw. W. Byrn.

INVENTOR
George W. Dudley.
BY
Munn & Co.
ATTORNEYS.

(No Model.) 9 Sheets—Sheet 8.
G. W. DUDLEY.
COMBINED ADDING AND PRINTING MACHINE.

No. 555,039. Patented Feb. 18, 1896.

WITNESSES:
Fred G. Dieterich
Edw. H. Byrn

INVENTOR
George W. Dudley
BY Munn & Co.
ATTORNEYS.

United States Patent Office.

GEORGE W. DUDLEY, OF CHARLESTON, WEST VIRGINIA, ASSIGNOR TO THE NUMEROGRAPH MANUFACTURING COMPANY, OF SAME PLACE.

COMBINED ADDING AND PRINTING MACHINE.

SPECIFICATION forming part of Letters Patent No. 555,039, dated February 18, 1896.

Application filed January 7, 1895. Serial No. 534,106. (No model.)

*To all whom it may concern:*

Be it known that I, GEORGE W. DUDLEY, of Charleston, in the county of Kanawha and State of West Virginia, have invented a new and useful Improvement in a Combined Adding and Printing Machine, of which the following is a specification.

The object of my invention is to provide a machine for quickly and accurately adding a column of figures, and at the same time and by the same manipulation of keys printing upon a sheet of paper these figures in the order in which they are added, so as to form a proof-sheet which shall verify the correctness of the addition, and which machine, by special adjustments, may be made to print at the bottom of the column the sum total of the column and to do all this work either in a vertical descending progression or vertically-ascending progression, or in a horizontal progression, as will be hereinafter more fully described with reference to the drawings, in which—

Fig. 2 is an underneath plan view with parts broken away. Fig. $2^a$, Sheet 6, is a section on the line $2^a$ of Fig. 2, looking in the direction of its arrow. Fig. $2^b$, Sheet 3, is a sectional view of the escapement mechanism shown next to the motor in Fig. 2. Fig. $2^c$ is a section on line $2^c$ of Fig. $2^b$. Fig. $2^d$ is a similar section on line $2^d$ of Fig. $2^b$. Fig. $2^e$ is still another section on the line $2^e$ of Figs. $2^b$ and $2^h$. Fig. $2^f$ is a section on the line $2^f$ of Fig. 2, and Figs. $2^g$ and $2^h$ are side and edge views in detail of the escapement-arms $M^9$ $M^{10}$. Fig. 5 is a vertical transverse section on line 5 5 of Fig. 2, looking in the direction of its arrow. Fig. $5^a$ is a detail section of the clutch at the lower end of lever G in Fig. 5.

As the operations of the machine in detail are somewhat involved, I shall, for the sake of perspicuity, first describe only the leading functions of the machine and the prominent external instrumentalities for imparting the proper motion to the machine for causing it to exercise these several functions, and afterward describe more in detail the several groups of instrumentalities and their connections whereby these functions are rendered operative in conjunction with each other.

Referring to Figs. 1, 2, 3, 4, 5, 6, and 8, X represents the outer case of the machine, which stands upon a base Y, from which it may be lifted.

Figure 1:
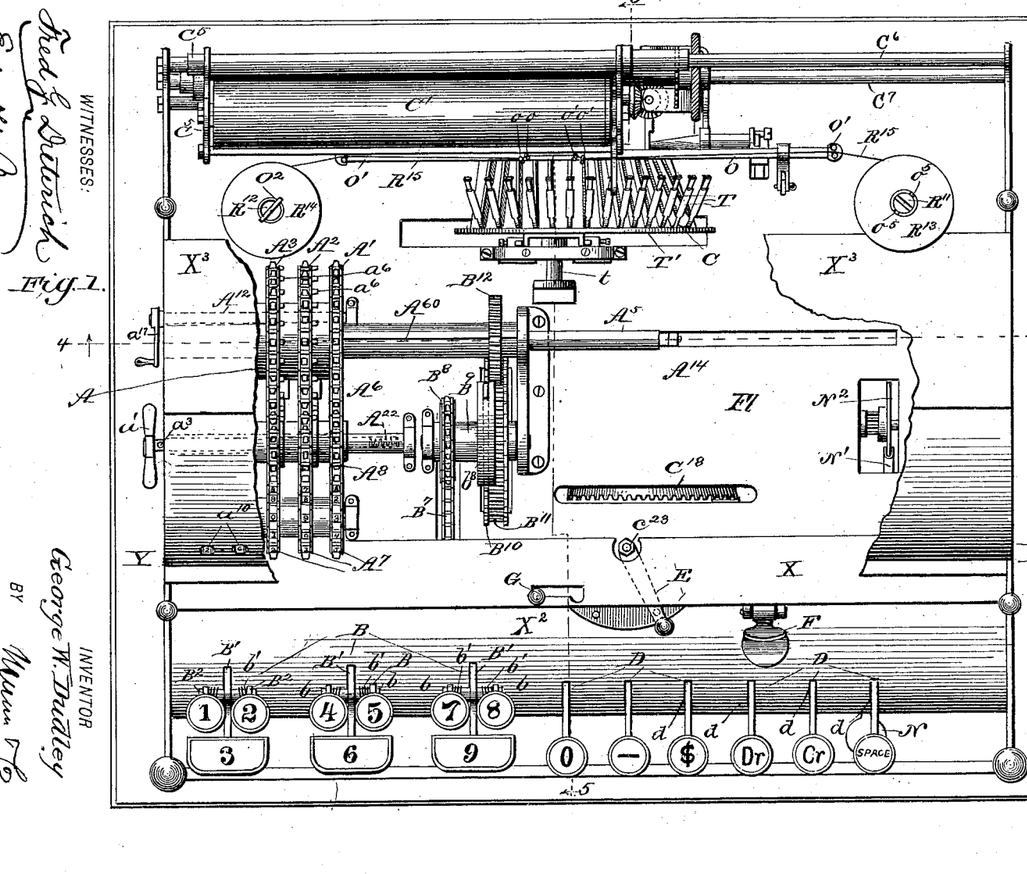
Figure 1 is a top plan view with parts of the housing broken away.
Figure 3:
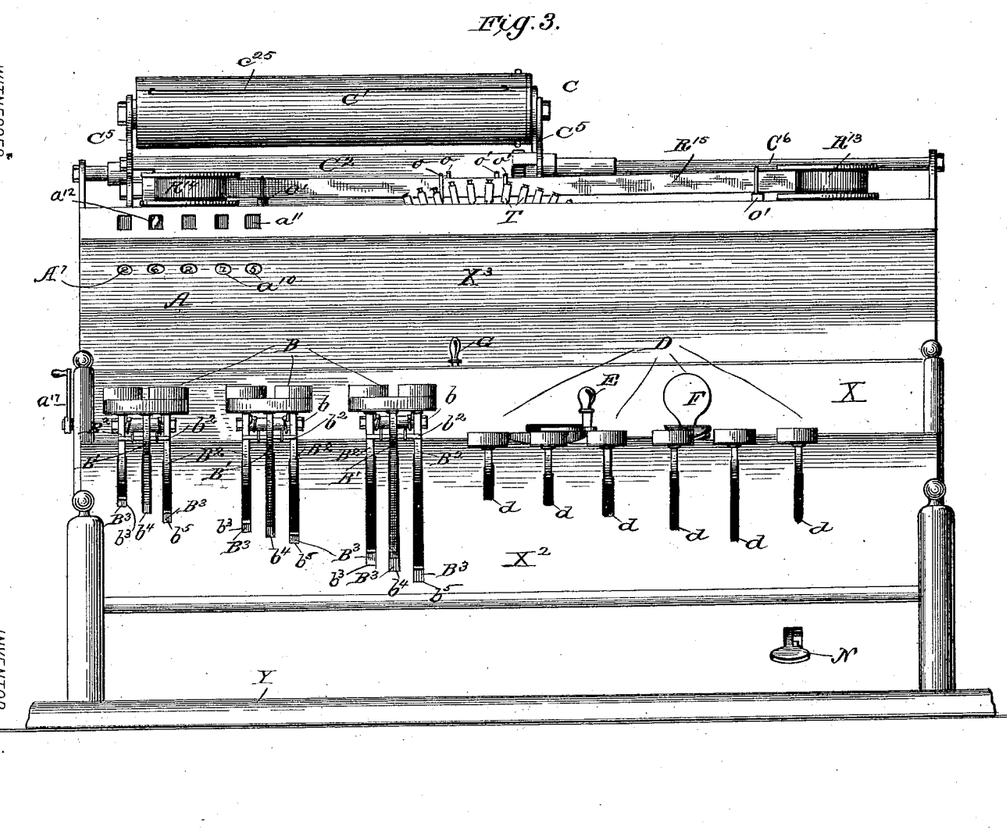
Fig. 3 is a front elevation.

At A, Figs. 1 and 3, is shown a series of adding devices comprising numbered wheels or disks $A^7$ with carrying devices which are acted upon by a group of numbered keys B to perform the work of addition.

At C is shown a type writing or printing device upon which every figure successively added on the adding device A is immediately or simultaneously printed in either a vertical or horizontal series, corresponding to the column to be added.

D represents a group of character-keys, comprising a cipher, dash, dollar-mark, debit and credit marks, and space. These do not act upon the adding device A at all, but solely upon the printing device.

E is a reversing-lever which changes the progression of the feed of the printing device from down to up, or vice versa.

F is a thumb-piece whose manipulation changes the direction of the feed of the printing device from vertical to horizontal, or vice versa, and G is a change-lever that throws the printing device C into range of operation of the numbered keys B and out of range of operation of the character-keys D, or vice versa.

The trains of mechanism through which these several parts act will be separately described hereinafter.

I will first describe the construction and operation of the adding mechanism A.

Figure 7:
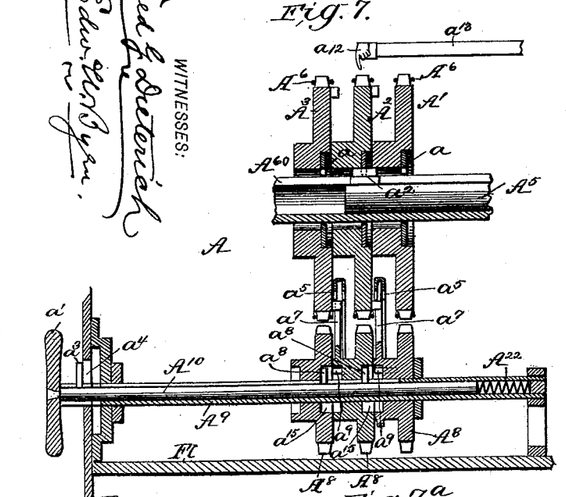
Fig. 7 is a sectional view of the adding devices, taken on the line 7 7 of Fig. 8. Fig. $7^a$ is a cross-section of sleeve $A^9$ and shaft $A^{10}$ of Fig. 7, taken between two of the wheels $A^8$.
Figure 8:
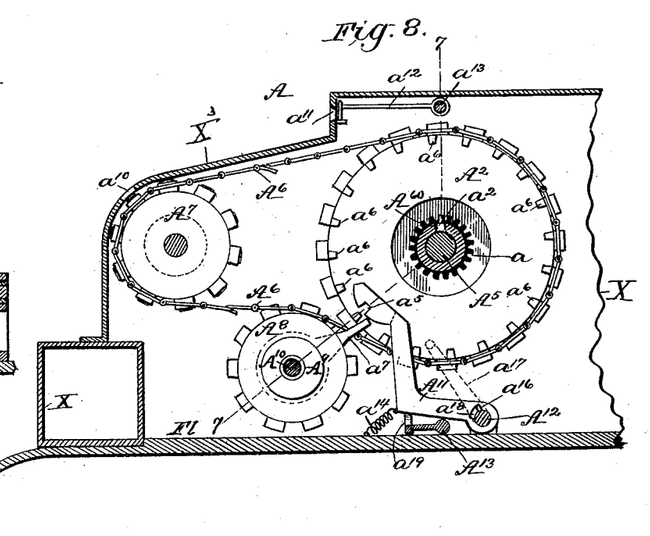
Fig. 8 is a cross-section taken through the adding devices on line 8 8 of Fig. 4.

Referring to Figs. 1, 3, 5, and 8, $X^3$ represents that part of the casing X that forms the housing for the adding mechanism, which housing is formed with a series of openings $a^{10}$, through which shows the numbered faces of a series of wheels $A^7$, Figs. 1, 3, 5, and 8. There is one of these wheels for the denomination of units, another for the tens, another for the hundreds, and so on, each of which has numbers on its periphery from 0 to 9, equally spaced and arranged to show through the openings $a^{10}$. Each wheel $A^7$ is formed with sprocket-teeth which connect with a chain belt $A^6$, which passes over a corresponding larger sprocket-wheel $A'$ $A^2$ $A^3$, &c., in the rear, which has twice as many teeth as the series of wheels $A^7$. Another series of sprocket-wheels $A^8$, Figs. 7 and 8, is located below the chain belt and in engagement with it. This series of wheels $A^8$ has the same number of teeth as the wheels $A^7$, and co-operates with the larger wheels for the purpose of carrying from one denomination-wheel to the next when the successive additions equal or exceed ten. This carrying is effected as follows: Motion is imparted to the wheels $A^7$ and $A^8$ from the larger wheels $A'$ $A^2$ $A^3$, &c., in the rear. These have each a laterally-projecting lug $a^6$, Fig. 8, for each notch or tooth.

$A^{11}$ is an elbow-shaped detent pivoted on a shaft $A^{12}$ and having a notch $a^5$ which drops down upon and holds successively each one of the lugs $a^6$, being held to this locked position by a spring $a^{14}$. On each of the wheels $A^8$ is a rigid radial arm $a^7$, and this arm of a wheel $A^8$ of one denomination acts upon the lugs $a^6$ of the wheel $A^2$ of next higher denomination—that is to say, supposing $A'$, Fig. 7, is a units-wheel, $A^2$ the tens, and $A^3$ the hundreds, the units-wheel $A'$ will act upon the first wheel $A^8$ through its chain, and the small wheel $A^8$ will, through its arm $a^7$, act upon the lugs $a^6$ of the next wheel $A^2$, Fig. 8, of the higher denomination at every complete rotation of wheel $A^8$, or whenever the aggregate sum of additions equals or exceeds ten. As the wheel $A^8$ rotates, its arm $a^7$ first lifts the detent $A^{11}$ until its notch $a^5$ is off of lug $a^6$ and the arm $a^7$, striking that lug $a^6$, turns wheel $A^2$ of higher denomination one notch, the detent $A^{11}$ immediately dropping back again and engaging the next lug $a^6$. As the wheels $A'$ $A^2$ $A^3$ thus rotate they in turn transmit their motion through the chains $A^6$ to the corresponding series of wheels $A^7$ whose numbered faces show through the openings $a^{10}$ in the case and indicate the totals of the addition performed.

Figure 7A:
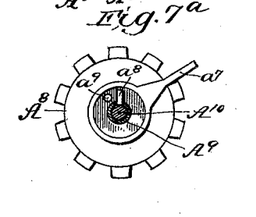

When the addition is completed and it is desired to commence on other work, the wheels $A^7$ must each be set back to the zero-point. This is done through the wheels $A^8$, which are in gear with $A^7$ through the chain belts. Each wheel $A^8$ has on its side a hollow boss, Figs. 7 and $7^a$, with a laterally-projecting pin $a^9$ in it. This pin on each wheel bears such relation that when carried to a certain point the zero-mark of wheels $A^7$ will show through the openings $a^{10}$. These pins $a^9$ of the wheels $A^8$ are restored to this point as follows:

$A^9$, Figs. 7 and $7^a$, is a hollow shaft on which the wheels $A^8$ are hung. This hollow shaft has a longitudinally-sliding stem $A^{10}$ within it, having a series of radial pins $a^8$ that protrude through a longitudinal slot in the hollow shaft $A^9$ and lie normally within a recess $a^{15}$ on one side of each wheel $A^8$. A helical spring $A^{22}$ lies within the end of the hollow shaft and forces the stem $A^{10}$ outwardly, so that its pins $a^8$ lie normally in the recesses $a^{15}$ aforesaid and afford no obstruction to the movement of the wheels. The end of the stem $A^{10}$ terminates outside the case in a hand-wheel or handle $a'$ and has a radial key or bit $a^3$ which, when the stem is pushed in, passes through a keyhole $a^4$. When this stem is thus forced in against the tension of the spring $A^{22}$ it causes all of the pins $a^8$ to pass out of their recesses $a^{15}$ and to enter the hollow bosses of the next wheels $A^8$, and then, when said stem is partially rotated, its pins $a^8$ (see Fig. $7^a$) engage with the pins $a^9$ of the wheels $A^8$ in whatever position they may be, and by turning them all to a predetermined point rotate the wheels $A^7$ through the belts and restore them all to zero. To do this successfully it is necessary to unlock all of the detents $A^{11}$ of the wheels $A'$ $A^2$ $A^3$, &c., and for this purpose the axial shaft $A^{12}$ has outside the case a rigid arm $a^{17}$, Figs. 4 and 8, which when deflected causes a lug or key $a^{16}$ on said shaft to turn in the slot $a^{18}$ in the detent $A^{11}$ and simultaneously lift all of said detents. This slot $a^{18}$ and lug $a^{16}$ are necessary features of this part of the device, in order to permit an individual action of each detent $A^{11}$ when lifted by a sliding bar $A^{13}$ and its cam $a^{19}$ in carrying, whose operations will be described hereinafter.

Figure 2:
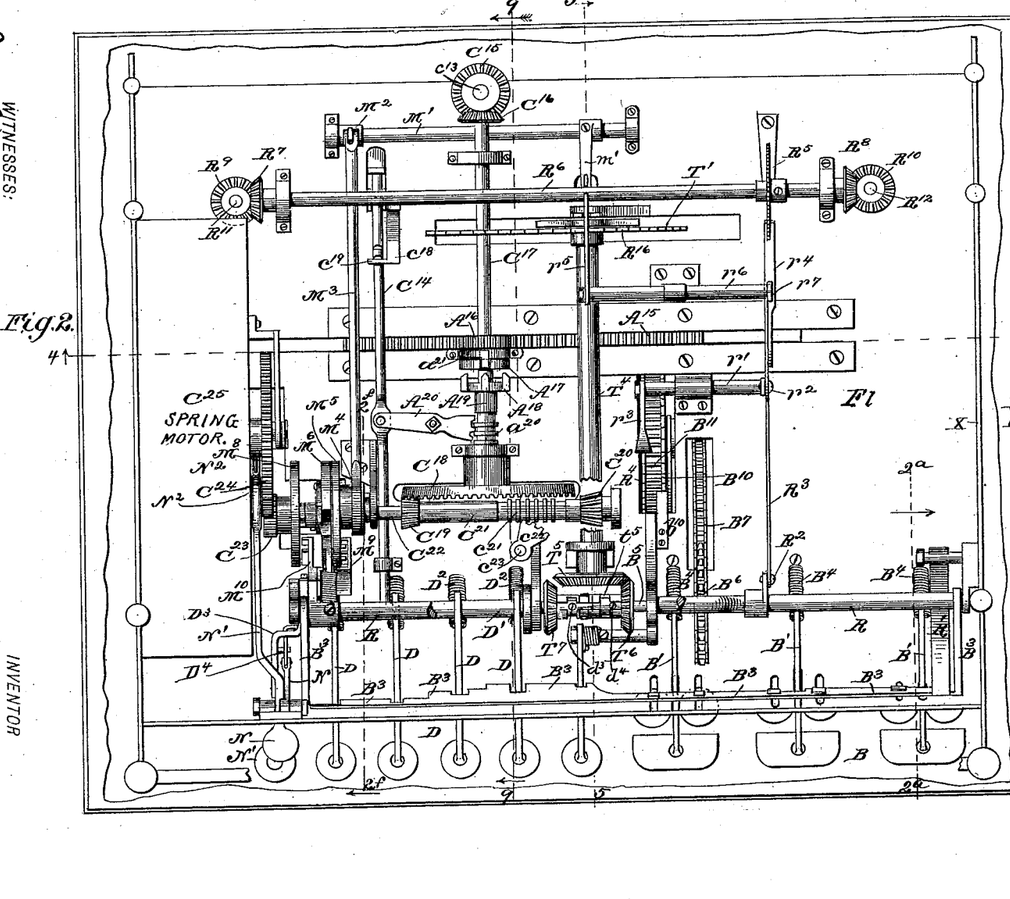

I will now describe how motion is imparted to the wheels $A'$ $A^2$ $A^3$ from the group of keys B. These keys, Figs. 1, 2, and 3, are nine in number and are provided with faces numbered from 1 to 9, inclusive. They are arranged in sub-groups of three, the first group carrying the numbers 1 2 3, the second 4 5 6, and the third 7 8 9. The front key of each sub-group is made broad or elongated in horizontal direction and the other two of each sub-group lie immediately behind this broad key. This is for the purpose of enabling the operator the more readily to locate and manipulate these keys without taking his eye off of the column of figures being added. As each group is constructed, arranged, and operated alike, it will be sufficient to describe one with this further explanation that each higher group has a little longer throw or movement than the next lower one.

Figures 2A, 5, 5A:
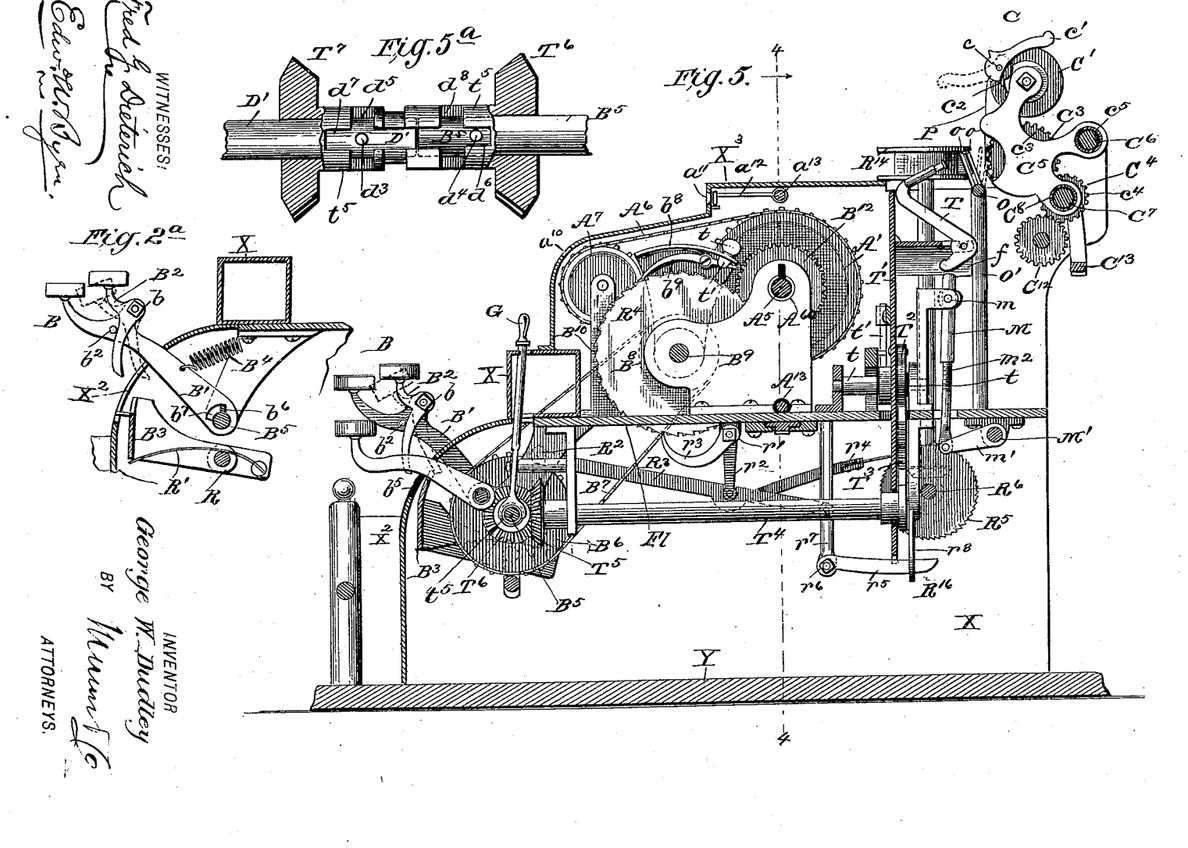

B', Figs. 1, 2, 3 and 5, is the main key-lever provided with a numbered face and carrying on the opposite sides of it two smaller key-levers $B^2 B^2$, which are fulcrumed upon lateral pins $b$ and forced by springs $b'$, Fig. 1, to lie with their lower ends against stop-pins $b^2$, Figs. 3 and 5, also projecting laterally from the main key-lever. The main key-lever $B'$ has a simple movement in transmitting its effect when depressed, but the smaller or supplementary key-levers $B^2$ have a compound movement—that is to say, when they are depressed they first turn on their axial pins $b$, as indicated in dotted lines in Figs. $2^a$ and 5, to bring their lower ends into engagement with co-operating devices, and then move down, carrying down the main key-lever $B'$, which serves to support them, thus avoiding the necessity of multiplying the main key-levers. All of these key-levers, both the main levers $B'$ and the short ones $B^2$, act singly or individually upon a depression-bar $B^3$ fulcrumed on shaft R, Figs. 2, $2^a$, 5, and 9, with a different throw, but move it a uniform distance for feeding or spacing, as hereinafter described. The different throw of these levers is determined by different stopping-points on the lower part, $X^2$, of the case formed by slots in the case having bearings $b^3$ $b^4$ $b^5$, Figs. 3 and 5, each one of which is a little lower than the preceding one. When the main key-lever $B'$ is depressed it acts directly upon the depression-bar $B^3$ and also upon the middle bearing $b^4$ of the case and is stopped by the latter, while the smaller key-levers $B^2$ carried by it do not touch anything, because they are held out of range of such engagement (see Figs. $2^a$ and 5) by their springs $b'$. When, however, one of them is depressed its lower end is first thrown into range of engagement with the depression-bar and the slot-bearing $b^3$ or $b^5$, as shown in dotted lines in Figs. $2^a$ and 5, and its further descent with the main key-lever causes it to come into contact with the bearing $b^3$ or $b^5$ of the case and the depression-bar. The stopping-points of these three levers of each group are so arranged that the short lever $B^2$ on the left of any group has the shortest stroke, the middle or main lever a little longer stroke, and the short lever on the right still a longer one, and all these different strokes are imparted through the one main key-lever of each group. It will be observed that the second group commences with a stroke a little longer than the long stroke of the preceding group, so as to give a throw of a different range to each and every one of the key-levers in order to cause each to turn the addition-wheels a different distance.

The main key-levers $B'$ are held up by springs $B^4$, Figs. 2 and $2^a$, and impart their throw to a rock-shaft $B^5$ under the housing. To gear each key-lever $B'$ to the rock-shaft so it will be rocked by any one key-lever without affecting the others, the rock-shaft $B^5$ has a key or feather $b^6$ that works in a curved slot $b^7$ of each key-lever, (see Fig. $2^a$,) and these slots are constructed of different lengths and so graduated (as is well known in such devices) that the lever of shortest throw has the longest slot to permit of the maximum movement of the rock-shaft's feather in this slot without affecting that lever, and yet each lever by engagement with the feather imparts to the rock-shaft the specific throw of each of the different keys.

The rock-shaft $B^5$ is journaled in hanger-bearings within the case and is provided with a rigid sprocket-wheel $B^6$, Figs. 2 and 5, which through a chain $B^7$, Figs. 1, 2, and 5, imparts its motion to another sprocket-wheel $B^8$ on a rock-shaft $B^9$ above. This rock-shaft $B^9$ has a rigid swinging arm $b^8$ carrying a spring-pawl $b^9$ which engages with a ratchet-wheel $B^{10}$ on a loose gear-wheel $B^{11}$ on rock-shaft $B^9$, and this gear-wheel engages a pinion $B^{12}$ on the hollow shaft $A^{60}$, (see Figs. 1 and 5,) and through the mechanism just described transmits the throw of the key-levers B to the wheels $A'$ $A^2$ $A^3$ of the adding mechanism. To hold the ratchet-wheel $B^{10}$ against backward movement while the working pawl $b^9$, Fig. 5, is taking a position for a new hold a back-thrust detent $b^{10}$, Fig. 2, is provided beneath the upper floor, $F'$, of the case, the machine having a lower floor or base, Y, and also an upper floor, $F'$, which latter forms a support for most of the working parts of the machine. Each or any of these wheels $A'$ $A^2$ $A^3$, &c., is independently locked to the shaft $A^{60}$, according to the denomination of the row of figures being added, by a device which connects with any one of said wheels. This consists of a longitudinally-sliding-rod $A^5$ (see Figs. 1, 5, 7, and 8) which moves centrally within the hollow shaft $A^{60}$ and has a square bit $a^2$, Figs. 7 and 8, that projects through the longitudinal slot in shaft $A^{60}$ and is adapted to be thrown into the plane of the internally-projecting teeth $a$ of the wheels $A'$ $A^2$ $A^3$ to lock any one of these wheels to shaft $A^{60}$ without locking the others. The longitudinal movement of the rod $A^5$ is imparted by a vertical standard $A^{14}$, Fig. 4, to which is also attached the parallel and horizontal slide-rods $A^{13}$ and $a^{13}$. The former of these lies below the wheels $A'$ $A^2$ $A^3$ and has a cam $a^{19}$, Figs. 4 and 8, that lifts the detent $A^{11}$ out of engagement of the same denomination-wheel ($A^2$, for instance) that is engaged by the bit $a^2$ of the slide-rod $A^5$, so that said wheel may turn. The slide-rod $a^{13}$ lies above the wheels, being also attached to the standard $A^{14}$, and moves with the slide-rods $A^5$ and $A^{13}$ and carries an arm $a^{12}$, Figs. 3, 4, 5, 7, and 8, that shows through a series of holes $a^{11}$ in the outer case and always appears at that opening directly over the wheel of that denomination which is being added, so that the operator may always know in what column of figures he is adding.

Figure 4:
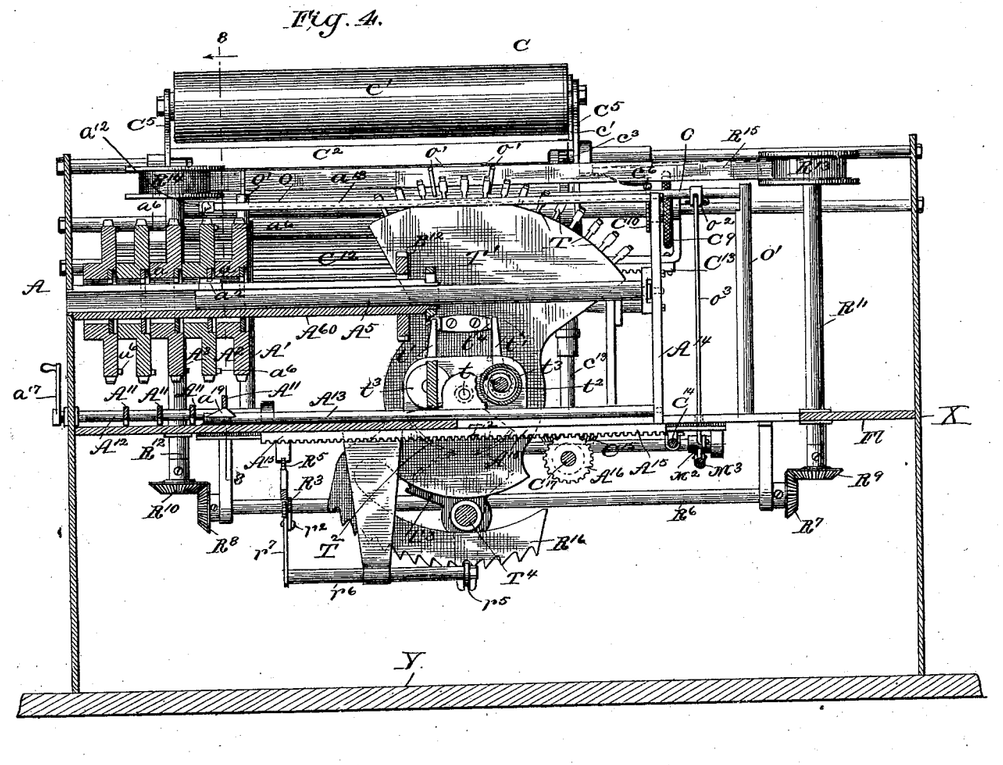
Fig. 4 is a vertical longitudinal section taken on line 4 4 of Figs. 1, 2, and 5, looking in the direction of their arrows.

For shifting the standard $A^{14}$ with slide-rods $A^5$ $A^{13}$ $a^{13}$ so as to bring the keys into co-operation with any one of the wheels $A'$ $A^2$ $A^3$ a sliding rack-bar $A^{15}$, Figs. 2 and 4, is connected to the standard $A^{14}$ and is arranged in horizontal position beneath the upper floor of the casing, to be acted upon by a pinion $A^{16}$ and a feeding mechanism hereinafter described.

I will now proceed to describe the printing devices shown at C. These consist of a paper-roll holder with means for feeding both vertically and horizontally, a printing-ribbon, and an oscillating type-carrying and type-operating device arranged to cause the type to press the ribbon against the roll of paper.

Figure 6:
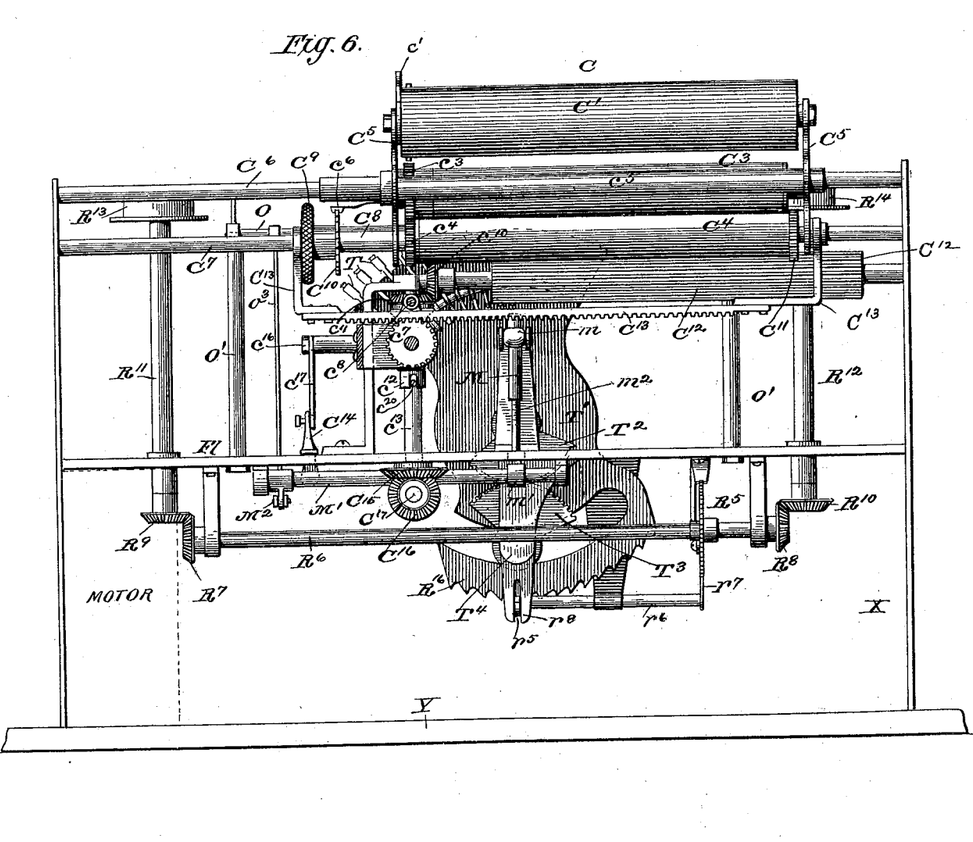
Fig. 6 is a rear elevation with parts broken away.
Figure 9:
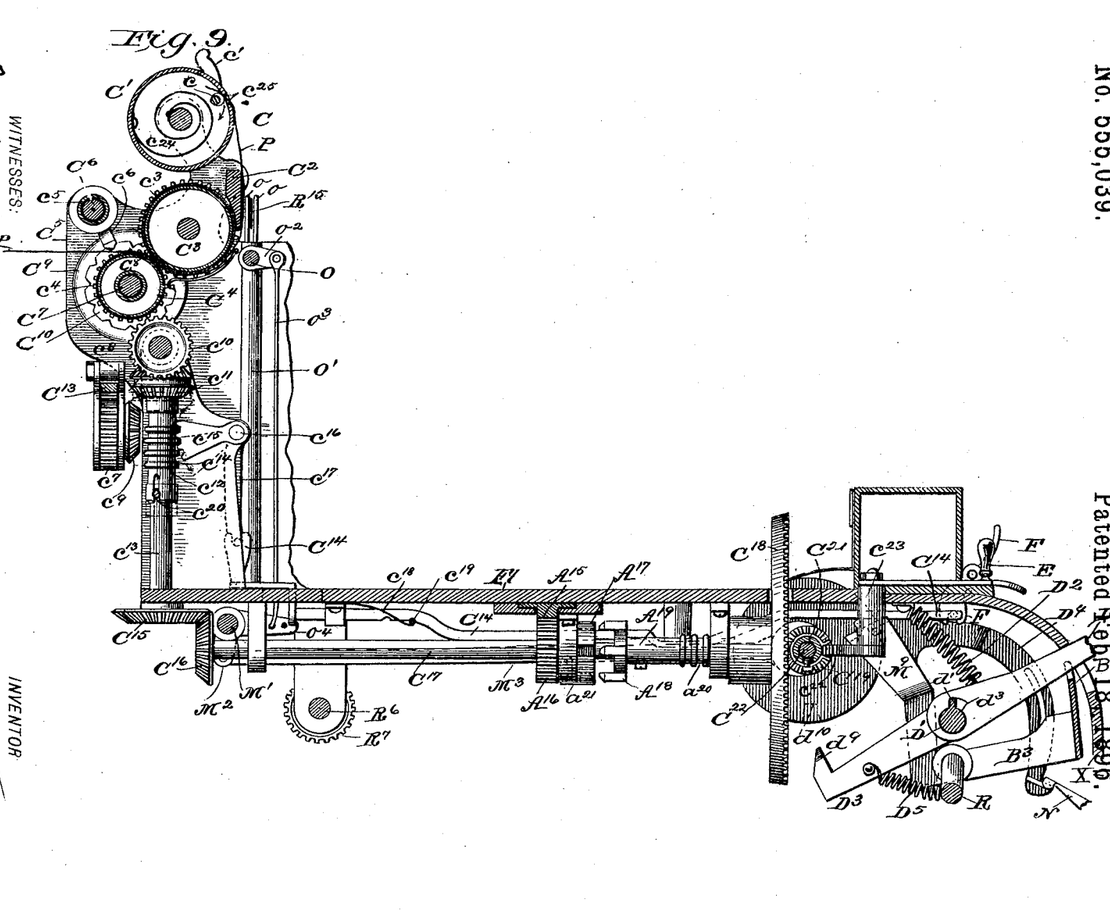
Fig. 9 is an enlarged transverse section of the machine, taken on line 9 9 of Fig. 2, looking in the direction of its arrow.

The paper-holder comprises an upper hollow roll, $C'$, Figs. 1, 3, 4, 6, and 9, provided with a coil-spring $c^{24}$, Fig. 9, within it after the manner of a spring-roller for curtains. This hollow roll has a longitudinal slit $c^{25}$ in its periphery, through which the end of the paper strip is inserted and in which it is retained by a longitudinal pinch-bar $c$, having an eccentric projection, which bar is journaled within bearings within the roll $C'$ and has a rigidly-attached rocking arm $c'$, Figs. 5 and 9, at the end outside the roll, which when rocked causes the pinch-bar to act like a cam and tightly clamp the end of the paper strip against the inner edge of the slot. This rocking arm $c'$ also serves to lock the roll-holder, so that its spring cannot exert any tension while inserting the paper, and for this purpose the head of the arm in the open position of the pinch-bar is made to enter a notch $c^2$ in a rigid disk on the framework, as shown in dotted lines in Fig. 5. The spring-roller $C'$ holds the paper strip taut and smooth and also supplies means for taking up the paper when fed in one direction. The paper strip P, which is wound upon this roll, passes (see Fig. 9) down in front of a rubber-faced platen $C^2$ and around a rubber-faced roll $C^3$, and thence up and over a rubber-faced roll $C^4$, which two rubber-faced rolls secure a frictional bite on the paper for feeding it down against the tension of the roll-holder or feeding it upwardly in response to this tension. The platen $C^2$ constitutes the back-thrust bearing for the strip of paper, against which the force of the blow of the type (delivered through the ribbon and paper) is borne. The two rubber-faced rolls $C^3$ $C^4$, Figs. 5, 6, and 9, are geared together by two gear-wheels $c^3 c^4$, so that they rotate together to feed the paper. All these rolls $C'$ $C^3$ $C^4$ and the platen are mounted upon a carrying-frame $C^5$, which slides horizontally upon two guide-rods $C^6$ $C^7$ fixed in the main frame of the machine. One of these rods, $C^6$, passes through a tube $c^5$ of the roll-frame, and the other, $C^7$, passes through the center of roll $C^4$. The roll $C^4$ has also a rigid sleeve extension $C^8$, Fig. 6, at one end, which carries a hand-wheel $C^9$, Figs. 6 and 9, and a notched disk $C^{10}$, which latter by engagement with a spring-detent $c^6$, mounted on tube $c^5$, defines the extent of movement for the roller $C^4$ in its intermittent feed.

Rotary motion is imparted to the feed-rolls by a gear-wheel $C^{11}$, Fig. 6, fixed rigidly on the rear roll $C^4$ and engaging with the long pinion or fluted roller $C^{12}$ arranged beneath the same. This pinion $C^{12}$ is made long, as a fluted roller, so that the gear-wheel $C^{11}$ may receive motion from the same always and at the same time be adjusted longitudinally in horizontal direction from time to time as the paper is fed laterally, as is necessary in a horizontal progression of figures or changing from one denomination to the next. To impart this horizontal longitudinal feed of the rolls a yoke $C^{13}$, Figs. 4, 5, 6, and 9, embraces the carrying-frame $C^5$ and is formed on its lower side with a series of rack-teeth which engage with a subjacent pinion $c^7$, and is held to contact therewith by an antifriction-roller $c^8$ above. It will thus be seen that the fluted roller forms the means for the transmission of the vertical or up-and-down feed to the paper, while the toothed yoke furnishes means for the lateral or horizontal feed.

The pinion $c^7$ has beside it and rigidly fixed on the same axis a bevel gear-wheel $c^9$, Fig. 9, occupying a vertical plane, and the fluted roller $C^{12}$ has also at its end a rigidly-attached beveled wheel $c^{10}$, Figs. 6 and 9, occupying a vertical plane, but at right angles to the bevel-wheel $c^9$. Between these two bevel-wheels $c^9$ $c^{10}$ there is a double bevel-wheel $c^{11}$ whose upper face is adapted to engage with the bevel-wheel $c^{10}$ when the double bevel-wheel is raised, as shown in Fig. 9, and whose lower face is adapted to engage with the bevel-wheel $c^9$, as shown in dotted lines, Fig. 9, when the double bevel-wheel is lowered. This double bevel-gear occupies a horizontal plane and is fixed upon a sleeve $c^{12}$ which is made adjustable on a vertical shaft $c^{13}$ and forms the means for imparting the feed motion either to the vertically-feeding devices through the upper bevel-wheel and fluted roller or to the lower bevel-wheel and toothed yoke. For imparting the vertical adjustment to the double bevel-gear and its sleeve the latter is formed with corrugations $c^{14}$, which are engaged by a toothed segment $c^{15}$, Fig. 9, formed on one arm of a rock-shaft $c^{16}$, Fig. 6, and whose other arm $c^{17}$ extends downwardly and is connected to the upturned end of a slide-rod $C^{14}$ moving in guides under the upper floor of the case and connected, Figs. 1, 2, and 9, at the front end to the lower end of a thumb-piece F, which when tilted in one position throws the the slide-rod $C^{14}$ back and when tilted to the other position throws the slide-rod forward, and thus by raising or lowering the double bevel-gear $c^{11}$ causes the feed of the paper to be vertical or horizontal, as may be desired. To define the throw of the slide-rod $C^{14}$, Figs. 2 and 9, a spring $c^{18}$ is provided with a locking-pin $c^{19}$ which is adapted to drop into notches in the slide-rod at the end of its movement in either direction and hold it firmly to place.

While the shifting of the feed devices is effected through the thumb-piece F and slide-rod $C^{14}$, the power for the actual feed is supplied through another means. The sleeve $c^{12}$ of the double bevel-gear is connected to its shaft $c^{19}$ by a pin and grooves $c^{20}$, Fig. 9, so that the sleeve turns with the shaft, although vertically adjustable on it, and this shaft has at its lower end a bevel gear-wheel $C^{15}$, Figs. 2, 6, and 9, engaging with a bevel-pinion $C^{16}$ on a horizontal counter-shaft $C^{17}$ hung in bearings under the upper floor of the case. The function of the counter-shaft is primarily to effect the feed of the paper, and this it does either up or down or forward and backward, according to the direction of movement of this counter-shaft. For this purpose the counter-shaft has a large bevel-wheel $C^{18}$, Figs. 1, 2, and 9, on its end, which is engaged alternately by one of two small bevel-pinions $C^{19}$ $C^{20}$ on opposite sides of the center of said large bevel-wheel, so as to impart a reverse motion to the same. The two bevel-pinions $C^{19}$ $C^{20}$ are fast on a sleeve $C^{21}$, having corrugations $c^{21}$, with which engages a toothed segment-arm $c^{22}$ (see Figs. 2 and 9) on the lower end of a vertical rock-shaft $c^{23}$, whose upper end is provided with the reversing-lever E, (see Figs. 1, 2, 3, and 9,) and which when turned in one direction throws the bevel-pinion $C^{19}$ into engagement with the large bevel-wheel $C^{18}$ of the counter-shaft and when thrown in the other direction throws the other bevel-pinion $C^{20}$ into engagement with said large bevel-wheel to reverse the motion of the counter-shaft. Motion is imparted to the sleeve $C^{21}$ from a central shaft $C^{22}$, Figs. 2 and 9, which passes through other mechanism hereinafter described and has a rigid pinion $C^{23}$ on its end engaging with a gear-wheel $C^{24}$ of a spring-motor $C^{25}$.

I will now return to the counter-shaft $C^{17}$ and explain a further function which it has in addition to transmitting the power to feed the paper. (See Figs. 2, 4, and 9.) On this counter-shaft $C^{17}$ is the pinion $A^{16}$ (see Figs. 2, 4, 6, and 9) which imparts the throw to the rack-bar $A^{15}$, standard $A^{14}$, and the slide-rods $A^5$, $A^{13}$ and $a^{13}$ of the adding device, which effect the change from one denomination-wheel to the next. This pinion $A^{16}$, Figs. 2 and 9, is loose on the counter-shaft, but is formed with a clutch-section $A^{17}$ that is adapted to be locked with the clutch $A^{18}$ on a sliding sleeve $A^{19}$ on the counter-shaft, which sleeve has a feather-and-groove connection therewith. Said sleeve also has a set of corrugations $a^{20}$ with which engages the segment-headed end of a lever $A^{20}$, Fig. 2, fulcrumed upon a pendent vertical pin and connected at its other end with the slide-rod $C^{14}$, so that when the slide-rod is moved longitudinally by its thumb-piece F to give the horizontal feed to the paper in changing from one denomination-column to the next the same movement through the segment-headed lever $A^{20}$, sliding sleeve $A^{19}$, and clutch causes the pinion $A^{16}$ on the counter-shaft to be locked to the counter-shaft, and the latter then by rotating the pinion $A^{16}$ moves the rack-bar $A^{15}$ longitudinally and adjusts the standard $A^{14}$ with its slide-bars $A^5$ $a^{13}$ $A^{13}$ horizontally to another denomination-wheel in the adding devices.

I will now proceed to describe how the key-levers B′ B² act to print the numbers on the paper of the printing devices.

T, Figs. 1, 3, 4, 5, and 6, are a series of type-levers. Nine of these on one side of the center bear the printing-figures 1 to 9 and the others on the other side have type-faces corresponding to the group of keys D. These type-levers are of a pot-hook shape and are fulcrumed at their lower elbows to a flange $f$ of a vibrating type-carrier T′ constructed as a plate occupying a vertical plane parallel to the paper. This type-carrier plate is provided with trunnions $t$, Figs. 1, 4, and 5, that oscillate in bearings on the main frame. This type-carrier is normally held in a vertical position, and when deflected to either side of its normal position to bring any one of the type into striking position on the paper it deflects a spring-arm $t'$, Fig. 4, of which there are two, one on each side of the center of the type-carrier, and which are connected to coil-springs $t^2$ inside of housings $t^3$, whose tension causes the arms to bear against lugs $t^4$ on the carrier-plate and restore it to the vertical position.

The carrier-plate T′ is oscillated to bring any one of its type into striking position by a toothed segment $T^2$, Figs. 5 and 6, fixed rigidly to the plate and engaged by a corresponding toothed segment $T^3$, fixed rigidly on a rock-shaft $T^4$ below the upper floor of the case. This rock-shaft, Figs. 2 and 5, has at its front end a rigidly-attached bevel-gear $T^5$, Figs. 2 and 5, that may be engaged by either of two bevel gear-wheels $T^6$ or $T^7$, one of which transmits the impulse of the keys B and the other the impulse of the group of character-keys D. These bevel-wheels $T^6$ $T^7$ which transmit the impulse of the key-levers are fixed in the opposite ends of a sleeve $t^5$, which swivels in the lower forked end of the change-lever G, (see Figs. 2, 5, and 5ª,) and whose position serves to bring either the group of number-keys B into co-operation with the type or the character-keys D, according to whether bevel-wheel $T^6$ is geared to $T^5$ or $T^7$ is geared to $T^5$, $T^6$ coupling the number-keys B and $T^7$ the character-keys D.

The sleeve $t^5$, Fig. 5ª, embraces the reduced end of rock-shaft $B^5$ on which the numbered key-levers are hung and carries at this end the bevel-wheel $T^6$, and the sleeve at its other end carries bevel-wheel $T^7$ and embraces the reduced end of a rock-shaft D′, upon which the character-keys D are hung, the shafts D′ and $B^5$ being in alignment and having their ends abutting within the sleeve $t^5$.

I have already described how the number-keys B each impart a different throw to the rock-shaft $B^5$ in turning the adding-wheels through the sprocket wheel and chain a different distance for each key, and it will be easily understood that this different throw for the rock-shaft will impart for each of the number-keys through bevel-wheels $T^6$ and $T^5$ (when engaged) a different throw to the type-carrier $T'$, corresponding to the throw of the addition-wheels, so that each number-key not only adds a corresponding number of digits on the adding devices, but also turns the type-carrier so that its type, representing that number, will be brought into position for depression. This depression is effected by other devices which will be hereinafter described in appropriate relation.

The character-keys D (see Figs. 2, 3, and 9) work through slots $d$ in the outer casing, and these slots (with the exception of the last one on the right, which is for the spacing-lever) are each of a different length, gradually increasing in length from left to right, so that the levers of these keys will come to a stop, bearing against the bottoms of the slots, so as to cause each to give a different extent of movement to the rock-shaft $D'$ on which they are hung. This rock-shaft is turned by the key-levers by a feather $d'$, Fig. 9, working in curved slots $d^3$ of the key-levers, and these slots are of different graduated lengths to cause the feather of this rock-shaft to oscillate in the slots of all the other key-levers after the manner of the feather on the rock-shaft of the number-key levers. The key-levers D are raised by springs $D^2$, one for each lever. The throw of these levers imparts a different extent of movement to the rock-shaft $D'$, and through its bevel-gear $T^7$ (when engaged with bevel-gear $T^5$) imparts a throw to the type-carrier $T'$ of a corresponding length, so as to bring its corresponding type into printing position. This throw of the group of keys D on the type-carrier $T'$ is in the opposite direction to that of the numbered keys B by reason of the positions of the bevel-gears $T^6$ $T^7$ acting upon opposite sides of the bevel-gear $T^5$, so that the type-carrier is moving in one direction over to one side of its middle line by the number-keys, and in the other direction and over to the other side of its middle line by the character-keys.

To cause the sleeve $t^5$ to be engaged with the rock-shaft of the number-keys and released from the rock-shaft of the character-keys when the sleeve is in one position and engaged with the rock-shaft of the character-keys and released from the rock-shaft of the number-keys when in the other position, these two rock-shafts $B^5$ and $D'$ have near their abutting ends (see Figs. 2, 5, and $5^a$) a lug or pin $d^3$ and $d^4$, respectively, and the pin $d^3$ plays in a transverse slot $d^5$ of sleeve $t^5$ while pin $d^4$ of the other shaft is locked in a longitudinal slot $d^6$ of said sleeve, and conversely the pin $d^3$ is locked in a longitudinal slot $d^7$ of the sleeve, while pin $d^4$ plays in a transverse slot $d^8$, the shifting of the sleeve through the adjusting-lever G serving to lock one rock-shaft and unlock the other, and vice versa.

I will now describe the function and operation of the depression-bar $B^3$. (See Figs. 2, 5, and 9.) This runs along the front of the machine and is acted upon by all of the keys except the spacing-key, which is the last key on the right of Fig. 1. This depression-bar is in the nature of a yoke rigidly attached to a rock-shaft R and forced upwardly by a spring $R'$, Fig. $2^a$. This rock-shaft R through the action of the keys upon the depression-bar is made to perform several functions, as follows: It locks the addition-wheels against being thrown too far by momentum; it also feeds the type-writer ribbon, and it also further locks the type-carrier against being thrown too far by momentum, all of which is effected through a rigid upwardly-projecting arm $R^2$ and pitman $R^3$, Figs. 2 and 5.

To lock the addition devices a short rock-shaft $r'$ is journaled in bearings beneath the upper floor of the case and has one arm $r^2$ connected to the pitman $R^3$, (see Figs. 2 and 5,) and another arm $r^3$, which is constructed as a detent that engages with the teeth of a ratchet-wheel $R^4$, fixed fast on the gear-wheel $B^{11}$ of the adding devices. This detent engages the ratchet-wheel $R^4$ and locks the adding-wheels at the end of the throw of the adding-keys.

To move the type-writer ribbon $R^{15}$, Figs. 1, 2, 4, 5 and 6, a spring-pawl $r^4$, carried by the pitman $R^3$, Fig. 5, engages a ratchet-wheel $R^5$ on a horizontal shaft $R^6$, Figs. 2 and 6, journaled in hangers under the upper floor of the case. This shaft has a bevel-wheel $R^7$ at one end and a bevel-wheel $R^8$ at the other, and these engage, respectively, with other bevel-wheels $R^9$ $R^{10}$ on the lower ends of vertical shafts $R^{11}$ $R^{12}$, (see Figs. 1, 2, 4 and 6,) which at their upper ends carry spools or reels $R^{13}$ $R^{14}$ that carry the type-writer ribbon $R^{15}$, Figs. 1, 4 and 9, one spool paying off the ribbon and the other spool taking it up at each intermittent movement of the subjacent shaft $R^6$, as effected by the spring-pawl $r^4$ and ratchet-wheel $R^5$, through the pitman $R^3$ and the depression-bar $B^3$.

To lock the type-carrying frame against momentum at the end of the throw said frame is extended below the floor of the case, Figs. 2, 4, 5, and 6, and is provided with a curved row of teeth $R^{16}$ with which there engages a detent or locking arm $r^5$ on a rock-shaft $r^6$, which has at the opposite end a crank-arm $r^7$ that is connected to the pitman $R^3$, and whose action moves the detent-arm $r^5$ into engagement with the teeth on the lower end of the type-carrier frame whenever it has reached the limit of its throw. To prevent the lateral bending of the detent-arm $r^5$ its end is carried in a detent-guide or slotted bar $r^8$, Figs. 5 and 6, fixed to a rigid part of the framework.

I will now proceed to describe how the type-levers when brought into proper position to print are forced against the ribbon and are made to deliver an impression on the paper. This is effected through the power of the spring-motor $C^{25}$ before referred to.

M, Figs. 5 and 6, is a vertical impact-bar arranged in a central position just behind the type-lever carrier and arranged to rise with a sudden upward movement and deliver a blow upon the lower end of any one of the type-levers which causes the latter to move rearward at their upper ends, and deliver a blow against the ribbon and paper and then fall back from gravity to a resting place against the upper edge of the type-carrier again. This impact-bar slides vertically in a trunnioned guide $m$ and has a screw-sleeve $m^2$ in its length which permits it to be adjusted vertically. At its lower end it is jointed to a crank-arm $m'$ on a horizontal rock-shaft M′, journaled in bearings under the upper floor of the case. (See Figs. 2 and 5.) This rock-shaft has another downwardly-projecting crank-arm $M^2$, Figs. 2 and 6, which is connected with a pitman $M^3$, through which power is transmitted from the spring-motor $C^{25}$, as follows, (see Figs. 2 and $2^b$:)

The pitman $M^3$, Fig. 2, terminates at its front end in an eccentric-strap which embraces an eccentric-hub $M^4$, Figs $2^b$ and $2^f$, fast upon a disk $M^5$. Beside this disk is another hollow disk $M^6$ whose chamber faces that of the other disk. Within the hollow disk is a coiled spring $M^7$, one of whose ends is attached to one disk, $M^5$, and the other end to the other disk, $M^6$. Both these disks are loose on the shaft $C^{22}$ through which the paper is fed. On this same shaft and rigidly attached to it beside the hollow disk $M^6$ is another disk $M^8$, which is fast to and derives motion from the pinion $C^{23}$, which is also fast upon the shaft $C^{22}$, and which is in gear with the transmitting gear-wheel $C^{24}$, Fig. 2, of the motor. Before describing this mechanism in detail I would state that its effect is to take the power of the motor and intermittently store it up in the coil-spring $M^7$ of the hollow disk and then through an escapement $m^9$ $m^6$ $m^7$ $m^8$ $m^9$ set into operation by the keys to let out the tension of this coil-spring $M^7$ in a single rotation of the disk $M^5$, which through its eccentric-hub and the pitman $M^3$ causes the impact-bar to deliver a blow upon the type-levers. For this purpose the disk $M^8$ has lying against the hollow disk $M^6$ a collar $m^3$ with a shoulder $m^4$, Fig. $2^c$, on it, which, as the disk $M^8$ rotates from the power of the motor, catches against a spring-pawl $m^5$ on hollow disk $M^6$, and turning this disk puts the coil-spring within it under tension, which tension is imparted through the other end of the coil-spring to the other disk $M^5$. This latter disk is held against the tension of the coil-spring within the disk $M^6$ by the escapement, which is set into action by the depression-bar $B^3$ through the action of the keys. For this purpose the depression-bar has a rigid arm $M^9$, Figs. 2, $2^d$, $2^f$, and $2^h$, that has near its inner end two lugs $m^6$ $m^7$, Fig. $2^d$, that are arranged to be struck by two pins $m^8$ $m^{80}$ on the disk $M^5$ to limit the rotation of the latter—that is to say, when the arm $M^9$ of the depression-bar is in one position the lug $m^6$ stands in the path of the pin $m^8$, and when the arm $M^9$ is moved to its other position (indicated by dotted lines) the lug $m^6$ is taken out of the path of said pin, and the disk is allowed to rotate once from the tension of coil-spring $M^7$, but the same movement of the arm brings its other lug $m^7$ into the path of the pin $m^{80}$, so that the latter strikes it at the end of the rotation, and thus a step-by-step escapement is provided in which the tension of the coil-spring $M^7$ is expended in producing a single rotation of the disk $M^5$ and imparting a printing movement to the pitman $M^3$ and impact-bar M.

Figures 2B, 2C, 2D, 2E, 2F:
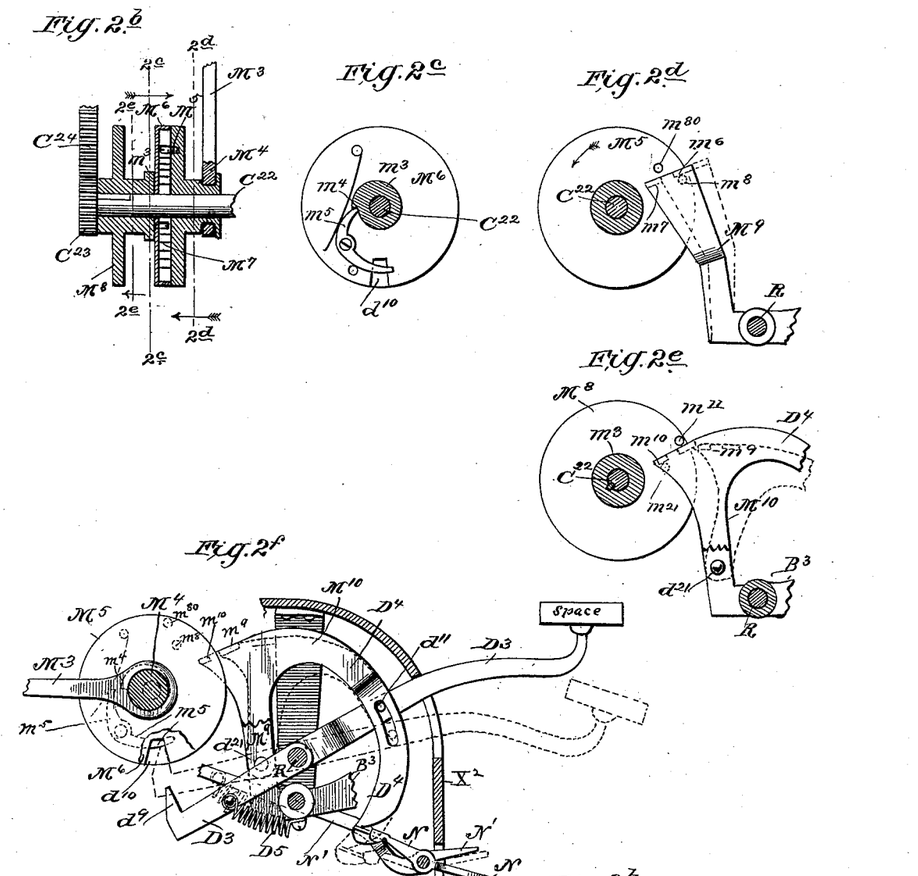
Figures 2G, 2H:
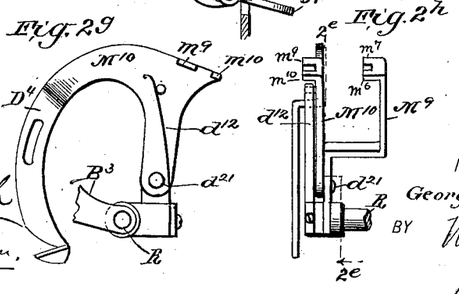

Beside the arm $M^9$ of the depression-bar is another arm $M^{10}$, Figs. $2^e$ and $2^f$, which has two stop-lugs $m^9$ $m^{10}$, which act upon pins $m^{11}$ $m^{21}$ of the disk $M^8$ and, acting as an escapement thereupon in the same manner, causes an intermittent discharge of the power of the motor through the same to wind up the coil-spring $M^7$ in the hollow disk at each depression of a key-lever and movement of the depression-bar $B^3$. Thus the power of the motor, as thus broken up into intermittent impulses, is directed through the disks on the shaft $C^{22}$ to the printing devices.

I will now describe how the spacing is effected without setting into operation the printing devices.

The last one of the group of character-keys on the extreme right is the spacing-key. This key has a long lever $D^3$, Figs. 2, $2^f$, and $2^g$, terminating at its inner end in a right-angular tooth $d^9$ and held by an independent spring $D^5$, so as to hold said tooth back and hold the key up. This tooth of this lever is in the plane of the hollow disk $M^6$, whose periphery is provided with a notch $d^{10}$ directly opposite the elbow of its spring-pawl $m^5$. The lever $D^3$ of this space-key is also provided with a pin $d^{11}$, that plays in a slot in a curved bar $D^4$, which is attached to the depression-bar arm $M^{10}$, said arm $M^{10}$ being connected to arm $M^9$ by a pivot $d^{21}$ and a spring $d^{12}$, Figs. $2^g$ and $2^h$. Now when the space-lever is depressed its tooth $d^9$ at its lower end enters the notch of disk $M^6$, locking it as against any backlash, and at the same time strikes against and deflects the spring-pawl $m^5$, unlocking this disk from the rigid disk $M^8$. This cuts out the transmission of power to the pitman and printing devices. Then as the lever $D^3$ moves farther its pin $d^{11}$ reaches the end of the slot in curved bar $D^4$, (see dotted lines, Fig. $2^f$,) deflects it, and also the spring-hinged arm $M^{10}$ of the depression-bar, and allows the stop-lugs $m^9$ $m^{10}$ on this arm to work with the rigid disk $M^8$ for transmitting a rotation of the same from the motor to the shaft $C^{22}$ and the adding and paper-feeding mechanism without working the printing devices.

In some cases in preparing a balance-sheet or statement of account it will be necessary to space continuously without either adding or printing. I will now describe how this is done.

N is a thumb-lever, Figs. 2 and 2$^f$, projecting through the front of the case and having its end which projects into the case arranged to bear upon the curved bar D$^4$, Fig. 2$^f$, of the pivoted arm M$^{10}$, which controls the motor-escapement disk M$^8$, Fig. 2$^e$, through its lugs $m^9$ $m^{10}$. When the spacing-key lever D$^3$ is pressed and its locking-tooth on the inner end engages and holds the hollow disk M$^6$ to lock the printing mechanism, the thumb-lever N is at the same time lifted, and this action throws down the curved bar D$^4$ and pulls the arm M$^{10}$, with its two lugs $m^9$ $m^{10}$, entirely away from the pin of rigid disk M$^8$, as in dotted lines, Figs. 2$^e$ and 2$^f$. The motor is now free to continuously expend its power on this disk M$^8$ and its rigid shaft, which continuously moves the paper-feeding mechanism without either adding or printing. To keep the motor and the paper-feeding mechanism from speeding when thus allowed to operate continuously, I provide a brake-lever N$^1$, which by the simultaneous action of the thumb-lever N is thrown against a brake-wheel N$^2$, Figs. 2 and 1, provided for the motor, which retards the motor movement and makes it fast or slow, according to the amount of pressure exerted through the thumb-piece and brake-lever.

In some cases it may be necessary to operate the printing and feeding mechanism without operating the adding devices, and for this purpose I provide (see Fig. 5) on the oscillating pawl-arm $b^8$, which turns the main working-ratchet of the adding-wheels, a thumb-piece $t$, which has a cam $t'$ on the lower end of the same, which, when the thumb-piece is turned one way, throws the spring-pawl $b^9$ out of the ratchet B$^{10}$ and allows the arm to oscillate without actuating the adding-gear. When this thumb-piece is turned into another position its cam allows the pawl to drop to engagement with the ratchet-teeth again and the adding-wheels are again thrown into operative connection with the keys.

When the type-levers are advanced to striking contact with the ribbon and paper, the ribbon lies flat against the paper and close to it, but when the type-levers fall back again the ribbon is withdrawn laterally from the paper so that the operator can see the impression made, and whereby also the feed of the ribbon is prevented from smearing or blurring the paper. This is effected (see Figs. 1, 4, 9, and 5) by carrying the ribbon through pairs of radial pins $o$ $o$ $o'$ $o'$ on a rock-shaft O extending horizontally in front of the platen and parallel with the same. This rock-shaft is journaled at its ends in upright posts O' O', which have ribbon-guides on their upper ends, and said rock-shaft is worked by a rigid arm $o^2$, Fig. 9, a vertical connecting-rod $o^3$, and a crank-arm $o^4$ on the oscillating shaft M' of the impact-bar, so that after every printing-impact the rod $o^3$ is pulled down and the ribbon rock-shaft O is turned so as to throw the radial ribbon-pins $o$ $o$ $o'$ $o'$ away from the platen, as in Fig. 5, thus removing the ribbon from the paper by a lateral movement that leaves the impression in full view, and also avoids smearing the paper when the ribbon is fed along.

When it is necessary to reverse the feed of the ribbon, this is accomplished (see Fig. 1) by a flat reversing-key O$^2$, which enters a slot $o^5$ in either of the spools R$^{13}$ R$^{14}$ and also a slot in the upper end of the spool-shafts R$^{11}$ R$^{12}$. When this key is inserted in these two registering slots it locks that spool to that shaft, and when the feed of the ribbon is to be reversed this key is taken out of one spool, R$^{14}$, (in which it now appears,) leaving that loose on its shaft, and is inserted in the other spool, R$^{13}$, locking that rigidly on its shaft, and thus reversing the feed.

When the adding mechanism is thrown out of gear by its clutch A$^{17}$ A$^{18}$, (see Fig. 2,) it is desirable to lock and hold the rack-bar A$^{15}$ against accidental movement, and for this purpose a spring-detent $a^{21}$ is provided, whose tooth lies upon the periphery of the clutch-section A$^{17}$, and when the clutch-section has its recesses closed by the lugs of the other clutch-section A$^{18}$ said detent merely slides on the periphery and has no effect, but when the lugs of the clutch-section A$^{18}$ leave the recesses of the other clutch-section, as shown, said spring-detent drops into such recesses and locks the adding mechanism. When the clutch is re-engaged the tapered lugs of the clutch-section A$^{18}$, Fig. 9, slide under the tooth of the spring-detent $a^{21}$ and force it out of the recesses in clutch-section A$^{17}$.

Having thus described my invention, what I claim as new, and desire to secure by Letters Patent, is—

1. A combined adding and printing machine, comprising a set of adding-wheels with carrying devices arranged in fixed relation to the other parts, a printing mechanism for printing the figures added consisting of laterally-adjustable paper-feed rolls and a single oscillating type-carrier with pivoted levers bearing printing-faces, a single impact-bar acting on any one of the type-levers, a feed mechanism, and a set of keys each of different throw connected to both the adding mechanism and the printing mechanism and adapted to move said adding and printing devices a distance commensurate with each other but varying for each of the keys substantially as shown and described.

2. A combined adding and printing machine comprising a set of adding-wheels with carrying devices arranged in fixed relation to the other parts, a printing mechanism consisting of laterally-adjustable paper-feed roll, and a single oscillating type-carrier with levers bearing printing-faces, those on one side of a middle line being numbers and those on the other being characters, an impact-bar operating on any one of the type-levers, a set of numbered keys connected to both the adding and printing mechanism and arranged to throw the type-carrier in one direction, a separate set of character-keys connected only to the printing mechanism and arranged to throw the type-carrier in the other direction, each of both sets of keys having a separate individual throw, and an adjusting device for throwing out of action the adding devices when the character-keys are coupled to the printing mechanism, substantially as shown and described.

3. A combined adding and printing machine comprising an adding mechanism, a printing mechanism, a set of keys connected to and operating both at the same time, and feed mechanism for the printing mechanism consisting of a series of gears with an elongated pinion $C^{12}$ interposed and rack-bar $C^{13}$ and means to feed vertically when adding the columns vertically and means to feed horizontally when printing the totals horizontally, and an adjusting device for changing the feed from vertical to horizontal or vice versa substantially as shown and described.

4. In an adding-machine, the combination with the adding devices; of a keyboard having its keys arranged in groups of three, one of the keys of any one group being made broad and mounted upon a main key-lever and the other two being behind the broad key and mounted upon spring-seated supplementary levers on opposite sides of the main lever, and a casing having slots of different length for each main key-lever and supplementary key-lever substantially as shown and described.

5. In an adding-machine, the combination of the wheels $A'$ $A^2$ $A^3$ having lugs $a^6$ upon their sides, a spring-detent $A^{11}$ for each, a corresponding group of wheels $A^7$ having numbered faces adapted to show through the case, corresponding chain belts $A^6$ connecting these two series of wheels, and a corresponding set of carrier-wheels $A^8$ also in gear with the chain belt and having arms $a^7$ adapted to lift the detents $A^{11}$ and act upon the lugs $a^6$ to turn the wheels one notch, substantially as and for the purpose described.

6. In an adding-machine, the combination with the wheels $A'$ $A^2$ $A^3$ having internal gears $a$ and lugs $a^6$ on their sides, detents $A^{11}$, the slotted axial shaft $A^6$ with central slide-rod $A^5$ having locking-bit $a^7$, standard $A^{14}$ and the two slide-rods $A^{13}$ and $a^{13}$, the former being provided with a cam $a^{19}$ adapted to unlock the detents $A^{11}$, and the latter being provided with an index-arm $a^{12}$ adapted to show through openings in the case, the said slide-rods $A^5$ $A^{13}$ $a^{13}$ being all connected together and adjustable from one denomination-wheel to another, substantially as shown and described.

7. In an adding-machine, the combination with the wheels $A'$ $A^2$ $A^3$ having lugs $a^6$ upon their sides; of separate detents $A^{11}$ for each having slots at their axes, and an axial shaft $A^{12}$ with feather $a^{16}$ working in said slots, and an external adjusting-handle to simultaneously lift all the detents in adjusting the adding devices to zero, substantially as shown and described.

8. The key mechanism, consisting of a main key-lever $B'$ having spring $B^4$ and axial pins $b$, the smaller key-levers $B^2$ pivoted thereon and provided with springs $b'$, and the case having slots with stop-seats $b^3$ $b^4$ $b^5$ at different levels to limit the stroke of the key-levers substantially as and for the purpose described.

9. The combination with the adding mechanism and its sprocket-wheel $B^8$; of the chain $B^7$, rock-shaft $B^5$ with sprocket-wheel $B^6$ and feather or key $b^6$, the key-lever $B'$ having slot $b^7$ and hung upon the rock-shaft, the depression-bar $B^3$ adapted to be struck by the key-lever, the printing mechanism and means substantially as described for connecting the depression-bar to the printing mechanism for the automatic feed, substantially as shown and described.

10. A type-writing attachment consisting of a printing-ribbon and guides embracing and arranged upon both sides of the plane of the printing-ribbon, combined with the printing-keys, a back-thrust bearing for the paper, and mechanism connecting the keys with the printing-ribbon guides to positively move the printing-ribbon, and its guides laterally both to and from the back-thrust bearing and at right angles to the direction of feed of said ribbon at each operation of a key substantially as shown and described.

11. The combination with a set of paper-feeding rolls; of a type-carrier pivoted or fulcrumed to oscillate in a plane parallel to the axis of the paper-feeding rolls, independent type-levers pivoted or fulcrumed upon the type-carrier, and a reciprocating impact-bar arranged in fixed guides to deliver a blow upon any one of the type-levers whenever the carrier is made to move and bring any one of its type-levers in line with the impact-bar substantially as shown and described.

12. A type-writing attachment, consisting of feed-rolls and an oscillating carrier for the type-levers, a series of type-levers mounted upon and pivoted to the same, a reciprocating impact-bar, operating-keys adapted to swing the type-levers into alignment with the impact-bar, and means for imparting a blow to the impact-bar substantially as and for the purpose described.

13. A type-writing attachment, comprising a set of feed-rolls, a carrying-frame having a rack-bar for longitudinal adjustment, gear-wheels for moving said rack-bar, other gear-wheels for rotating the feed-rolls, adjusting devices for throwing one set of gears into action and the other set out of action, printing-key levers, and a depression-bar adapted to be struck by the key-levers to transmit a stepby-step feed in either a vertical or horizontal direction, substantially as and for the purpose described.

14. A type-writing attachment, consisting of a set of feed-rolls for the paper, the roll on one side of the printing position being a spring-tension roll, and those on the other side being provided with positively-acting gears, and key-levers connected therewith for feeding the paper positively in either direction substantially as shown and described.

15. In a type-writer attachment, the combination of a hollow spring-roller, having a longitudinal slot, an internal eccentric pinch-bar for securing the edge of the paper, an external lever-handle for operating the pinch-bar having an enlarged end or head, and the framework having a notch adapted to receive the head of the lever to lock the roller against its spring-tension while inserting the paper substantially as and for the purpose described.

16. In a type-writer attachment, the combination with the type-levers, an impact-bar operating thereupon, and a paper-feeding mechanism; of a motor for actuating both the paper-feed and said impact-bar, a shaft connecting the motor to the paper-feed, and an intermediate spring-actuated escapement device hung upon said shaft and provided with an eccentric and interposed between the motor and impact-bar and arranged substantially as described to be alternately put under tension by the power of the motor and to intermittently discharge the stored-up power to the impact-bar of the printing devices, substantially as shown and described.

17. In a type-writer attachment, the combination with the printing devices and paper-feed devices; of a spring-motor for actuating both, a shaft with gears connecting the motor with the paper-feeding device, an intermediate spring-escapement mechanism composed of an oscillating lever and progressively but intermittently rotating disks with spring and stops hung concentrically upon said shaft and provided with an eccentric and adapted to be alternately put under tension by the spring-motor and to intermittently discharge this stored-up power to work the printing device, substantially as shown and described.

18. In a type-writer attachment, the combination with the printing devices and paper-feeding device; of a spring-motor for actuating both, a shaft with gears connecting the motor with the paper-feeding mechanism, an intermediate spring-escapement mechanism hung upon said shaft and provided with an eccentric and adapted to be alternately put under tension by the spring-motor and to intermittently discharge this stored-up power to work the printing devices, a spacing-key lever and mechanism for cutting out the intermediate spring printing device by the action of the spacing-lever without disconnecting the paper-feeding mechanism, substantially as shown and described.

19. In a combined adding and printing machine, an oscillating type-carrier having numbered type on one side of its middle line, and character-type on the other side of the middle line, springs for holding the type-carrier in a midway position in relation to the printing-point, a set of number-keys adapted to throw the type-carrier in one direction, and a separate set of character-keys adapted to throw the type-carrier in the opposite direction, substantially as and for the purpose described.

20. In an adding and printing machine the mechanism for feeding vertically or horizontally consisting of the combination of the thumb-piece F, slide-rod $C^{14}$, rock-shaft $c^{16}$ with crank-arm $c^{17}$; and toothed segment $c^{15}$, sliding and corrugated sleeve $c^{12}$ bearing double bevel-gears $c^{11}$, bevel gear-wheels $c^9$ and $c^{10}$ arranged to be alternately operated upon by the double bevel-gear, the long pinion $C^{12}$, the gear-wheels $c^3$ $c^4$ and attached feed-rolls $C^3$ $C^4$, a horizontally-adjustable frame carrying these rolls, a yoke with rack-teeth $c^{13}$ connected to said frame, and gear-wheel $c^7$ connecting the same with bevel-gear $c^9$ substantially as shown and described.

21. The mechanism for reversing the feed consisting of the combination of the paper-feeding rolls $C^3$ $C^4$, the laterally-adjustable frame with yoke and rack-teeth $C^{13}$, gears $c^7$ and $c^9$, and gears $c^3 c^4 c^{10}$, and long pinion $C^{12}$, the double bevel-gear $c^{11}$ with adjustable sleeve and means for actuating it, the vertical shaft $c^{13}$, bevel-gears $C^{15}$ $C^{16}$, shaft $C^{17}$ with attached bevel-wheel $C^{18}$, corrugated sleeve $C^{21}$ with bevel-gears $C^{19}$ and $C^{20}$, toothed segment $c^{22}$, rock-shaft $c^{23}$, and reversing-lever E, and a shaft $C^{22}$ with driving-motor, said shaft being connected to the sleeve $C^{21}$ by a feather-and-groove connection substantially as and for the purpose described.

22. The means for causing either set of keys B or D, to act upon the type-carrier, consisting of the combination of the feathered rock-shaft $B^5$ having key-levers B hung thereupon, and the feathered rock-shaft D' having key-levers D hung thereupon, the two shafts being in alignment and abutting, the adjustable sleeve $t^5$ embracing said abutting ends and having rigid bevel gear-wheels $T^6$ $T^7$ and connected to the said shafts by slots and pins as described, the shifting-lever G, for the sleeve, the rock-shaft $T^4$ with bevel gear-wheels $T^5$, the swinging type-carrier T', and toothed segments $T^2$ $T^3$ substantially as and or the purpose described.

23. The combination of the key-levers B, and the depression-bar $B^3$ with rock-shaft R, the crank-arm $R^2$, pitman $R^3$, rock-shaft r' with detent $r^3$ for the ratchet-wheel $R^4$ of the adding devices, spring-pawl $r^4$, ratchet-wheel $R^5$, and feed-shaft $R^6$ with bevel-gears at its ends operating the ribbon-spools, rock-shaft $r^6$ with crank-arm $r^7$ and detent $r^5$, and the oscillating type-carrier T' having teeth or notches $R^{16}$ on its lower edge, substantially as and for the purpose described.

24. The combination of the adding devices, and the rack-bar $A^{15}$ for feeding from one denomination to the next, the paper-feed shaft $C^{17}$ with loose pinion $A^{16}$, the clutch $A^{17}$ $A^{18}$ with locking-detent $a^{21}$, and means for operating said clutch through the slide-rod $C^{14}$ and thumb-piece F substantially as and for the purpose described.

25. The combination of the number-keys B and the character-keys D, separate aligned rock-shafts having abutting ends and operated by the keys, a type-carrier having both number and character type, a shaft with gears for oscillating the type-carrier, a locking-sleeve for alternately connecting these rock-shafts to the type-carrying shaft, and a depression-bar $B^3$ operated upon by both sets of keys for intermittent feed and adding devices connected with the number-keys substantially as shown and described.

26. The devices for transmitting indirectly the power of the motor to effect the printing and spacing, consisting of a prime mover having a gear-wheel $C^{24}$, a shaft $C^{22}$ having rigid pinion $C^{23}$ and disk $M^8$ with collar $m^3$ and shoulder $m^4$, the loose disks $M^5$ $M^6$ having a coil-spring between, whose opposite ends are connected respectively to these two disks, the disk $M^6$ having a notch $d^{10}$ and spring-pawl $m^5$, and the disk $M^5$ having an eccentric-sleeve with strap $M^4$ and pitman $M^3$, and an intermittent escapement for holding alternately the disks $M^8$ and $M^5$ to alternately store up power in the coil-spring and discharge it substantially as and for the purpose described.

27. The combination of disk $M^8$ having pins $m^9$ $m^{21}$, and the disk $M^5$ with pins $m^8$ and $m^{80}$, the two independent arms $M^9$ $M^{10}$ having respectively lugs $m^6$ $m^7$ and $m^9$ $m^{10}$, the depression-bar $B^3$ connected to these arms, and the intermediate hollow disk $M^6$ with coil-spring substantially as and for the purpose described.

28. The combination with the disk $M^6$ having notch $d^{10}$ and spring-pawl $m^5$, of the spring-pressed spacing-lever $D^3$ having tooth $d^9$ and pin $d^{11}$, the escapement-arm $M^{10}$ with curved and slotted extension $D^4$ for simultaneously locking the disk $M^5$ and operating the escapement, substantially as and for the purpose described.

29. The combination with the disks $M^5$ $M^6$ $M^8$ constructed as described; of the lever N, escapement-arm $M^{10}$ with curved and slotted extension $D^4$, the spacing-lever $D^3$ with tooth $d^9$ and pin $d^{11}$, and the brake-lever N substantially as and for the purpose described.

GEORGE W. DUDLEY.

Witnesses:
E. B. DYER,
E. L. BUTTRICK.